F. ONDRA.
PERCUSSIVE TOOL WITH DETACHABLE CUTTER.
APPLICATION FILED AUG. 13, 1913.
1,135,546. Patented Apr. 13, 1915.
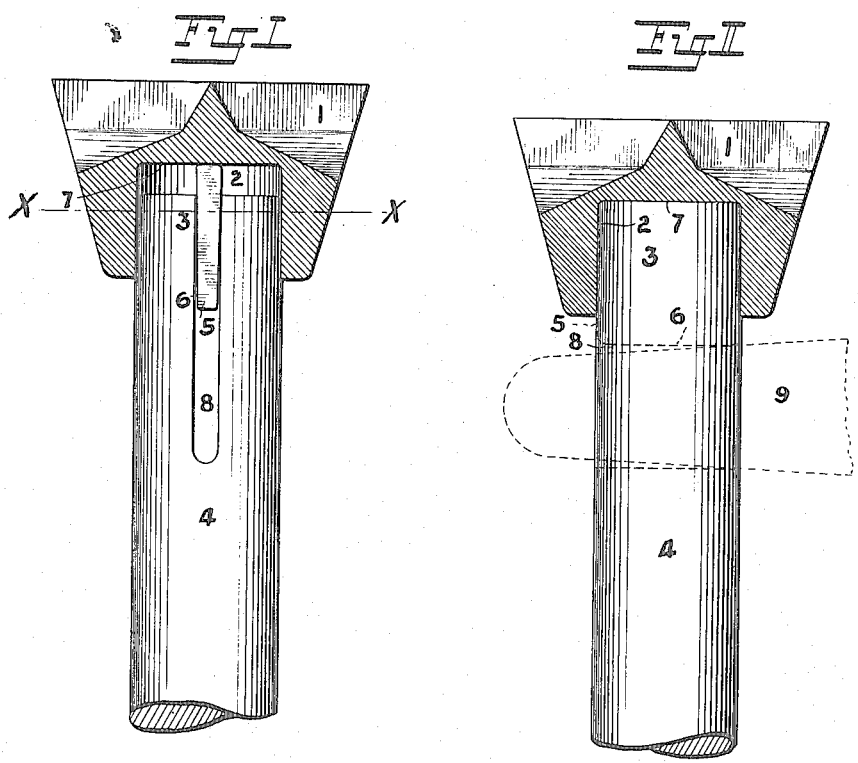
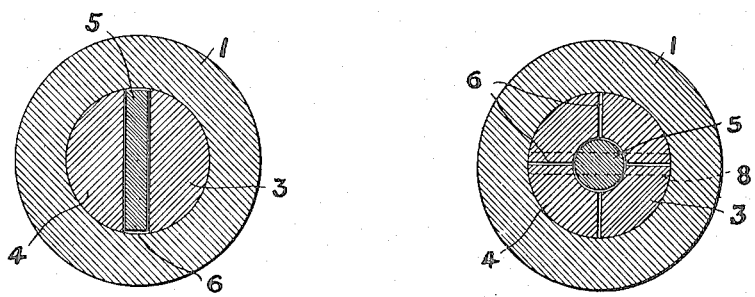

UNITED STATES PATENT OFFICE.

FRANK ONDRA, OF JOHANNESBURG, TRANSVAAL, SOUTH AFRICA, ASSIGNOR OF ONE-HALF TO MAX POLLAK, OF JOHANNESBURG, TRANSVAAL, SOUTH AFRICA.

PERCUSSIVE TOOL WITH DETACHABLE CUTTER.

1,135,546.  Specification of Letters Patent.  Patented Apr. 13, 1915.

Application filed August 13, 1913. Serial No. 784,482.

*To all whom it may concern:*

Be it known that I, FRANK ONDRA, an Austro-Hungarian subject, residing at 141 Stock Exchange Building, Johannesburg, in the Province of the Transvaal, Union of South Africa, have invented certain new and useful Improvements in Percussive Tools with Detachable Cutters, of which the following is a specification.

The present invention relates to rock drilling and like percussive tools which are required to transmit to their cutting end blows delivered on their other end, said tools being of the kind comprising a shank and a detachable cutter; and it consists in the improvements hereafter described for securing said parts together.

The invention is illustrated in the accompanying drawings, in which:

Figure I shows the cutter being secured to the shank, the former being in section. Fig. II is a view at right angles to Fig. I and showing the parts locked together. Fig. III is a section on line X—X Fig. I; and Fig. IV is a view similar to Fig. III showing a modification.

According to this invention the cutter 1 is formed with a socket 2 into which the forward end 3 of the shank 4 is passed. Said end 3 of the shank is split or otherwise made expansible and is provided with means for expanding it within the socket and thereby securing the cutter. The socket 2 and end 3 of the shank are preferably parallel sided as shown.

For expanding end 3 of the shank it is preferred to use a wedge 5 which is placed in a slot 6 between the divided portions of the end 3 before the latter is entered into the socket 2. Upon the shank being forced into socket 2 wedge 5 makes contact with the bottom 7 of the latter and is driven into the former. It is finally driven home in the shank as shown in Fig. II whereby the parts are firmly held together by the friction due to the outward radial pressure of the shank on the wall of the socket.

The wedge is as a rule very slightly tapered and is so proportioned as to produce the desired expansion of the end of the shank simultaneously with the seating of the latter on the bottom 7 of the socket. The wedge 5 is longer than the depth of the socket 2 so that the wedge projects below the rear end of the cutter, while the slot 8 extends far enough along the shank to permit a cotter 9 to be inserted into it. Upon driving in said cotter the wedge 5 is forced outwardly of the slot, so relieving the radial pressure which retains the cutter on the shank. Simultaneously the wedge drives off the cutter from the shank, which movement is accomplished without difficulty, owing to the pressure between them being relieved as described.

If desired, the end of the shank may be split by a number of slots 6, as shown in Fig. IV. The wedge 5 in this case is circular in cross section and is adapted to be driven into a central hole formed axially in the end of shank 4.

What I claim and desire to secure by Letters Patent is:—

In a percussive tool, a detachable cutter formed with a socket, a shank having an end slotted longitudinally for a distance considerably greater than the depth of the socket, and a wedge between the divisions of the end of the shank and adapted to be driven home by contact with the cutter, said wedge being longer than the depth of the socket.

Signed by me at Johannesburg, in the Province of the Transvaal, this 10th. day of July, 1913.

FRANK ONDRA.

Witnesses:
 W. C. PULLALZ,
 WESLEY E. JOHN.